(12) United States Patent
Xu et al.

(10) Patent No.: US 12,170,379 B2
(45) Date of Patent: Dec. 17, 2024

(54) CATALYST LAYER WITH EXTENDED SURFACE AREA AND METHOD OF FORMING SUCH CATALYST LAYER FOR POLYMER ELECTROLYTE FUEL CELLS

(71) Applicants: The Board of Trustees of the Leland Stanford Junior University, Stanford, CA (US); Volkswagen Aktiengesellschaft, Wolfsburg (DE)

(72) Inventors: Shicheng Xu, Stanford, CA (US); Friedrich B. Prinz, Stanford, CA (US); Thomas Schladt, Wolfsburg (DE); Tanja Graf, Wolfsburg (DE); Jonathan Edward Mueller, Wolfsburg (DE); Sebastian Kirsch, Wolfsburg (DE); Gerold Huebner, Wolfsburg (DE); Vedran Glavas, Wolfsburg (DE)

(73) Assignees: The Board of Trustees of the Leland Stanford Junior University, Stanford, CA (US); Volkswagen Aktiengesellschaft, Wolfsburg (DE)

( * ) Notice: Subject to any disclaimer, the term of this patent is extended or adjusted under 35 U.S.C. 154(b) by 688 days.

(21) Appl. No.: 17/296,888

(22) PCT Filed: Nov. 25, 2019

(86) PCT No.: PCT/US2019/063099
§ 371 (c)(1),
(2) Date: May 25, 2021

(87) PCT Pub. No.: WO2020/112690
PCT Pub. Date: Jun. 4, 2020

(65) Prior Publication Data
US 2022/0029171 A1 Jan. 27, 2022

Related U.S. Application Data

(60) Provisional application No. 62/771,540, filed on Nov. 26, 2018.

(51) Int. Cl.
H01M 4/88 (2006.01)
H01M 4/92 (2006.01)
(Continued)

(52) U.S. Cl.
CPC ....... *H01M 4/8828* (2013.01); *H01M 4/8807* (2013.01); *H01M 4/8867* (2013.01);
(Continued)

(58) Field of Classification Search
CPC ....... H01M 2008/1095; H01M 4/8807; H01M 4/8828; H01M 4/8867; H01M 4/8892; H01M 4/926; H01M 8/1004; Y02E 60/50
See application file for complete search history.

(56) References Cited

U.S. PATENT DOCUMENTS 8,623,779 B2  1/2014  Shirvanian
9,153,822 B2  10/2015 Shirvanian
(Continued)

FOREIGN PATENT DOCUMENTS

CN  102449827 A  5/2012
JP  09-180730 A  7/1997
(Continued)

OTHER PUBLICATIONS

Machine translation KR100689105B1 (Year: 2007).*
(Continued)

*Primary Examiner* — Victoria H Lynch
(74) *Attorney, Agent, or Firm* — Foley & Lardner LLP (57) ABSTRACT

A manufacturing process includes: depositing a catalyst support on a gas diffusion layer to form a catalyst support-coated gas diffusion layer; depositing a catalyst on the catalyst support-coated gas diffusion layer to form a catalyst-coated gas diffusion layer; and depositing an ionomer on the catalyst-coated gas diffusion layer to form an ionomer-coated gas diffusion layer. A membrane electrode
(Continued)

assembly for a fuel cell includes: a gas diffusion layer; a polymer electrolyte membrane; and a catalyst layer disposed between the gas diffusion layer and the polymer electrolyte membrane, wherein the catalyst layer includes an ionomer, and a concentration of the ionomer varies within the catalyst layer according to a concentration profile.

8 Claims, 7 Drawing Sheets

(51) Int. Cl.
    *H01M 8/1004*     (2016.01)
    *H01M 8/10*     (2016.01)

(52) U.S. Cl.
    CPC ......... *H01M 4/8892* (2013.01); *H01M 4/926* (2013.01); *H01M 8/1004* (2013.01); *H01M 2008/1095* (2013.01)

(56) References Cited

U.S. PATENT DOCUMENTS

| | | | |
|---|---|---|---|
| 2012/0052409 A1* | 3/2012 | Komori | H01M 8/1016 429/442 |
| 2014/0080032 A1* | 3/2014 | Soboleva | H01M 4/8807 429/523 |
| 2014/0315121 A1 | 10/2014 | Ghielmi et al. | |
| 2016/0156054 A1 | 6/2016 | Chuy et al. | |
| 2017/0271687 A1 | 9/2017 | Chi et al. | |

FOREIGN PATENT DOCUMENTS

| | | |
|---|---|---|
| JP | 2006-134602 A | 5/2006 |
| JP | 2007-265734 A | 10/2007 |
| JP | 2007-317658 A | 12/2007 |
| JP | 2010-198800 A | 9/2010 |
| JP | 2014-135229 A | 7/2014 |
| JP | 2015-502630 A | 1/2015 |
| JP | 2019-106444 A | 6/2019 |
| KR | 100689105 B1 | 2/2007 |
| KR | 1020100068028 A | 6/2010 |
| KR | 101267786 B1 | 5/2013 |

OTHER PUBLICATIONS

Machine translation JP2014135229A (Year: 2014).*
International Preliminary Report on Patentability, with Written Opinion, on PCT/US2019/063099.
Hsueh et al., "Fabrication of catalyst by atomic layer deposition for high specific power density proton exchange membrane fuel cells", Journal of Catalysis, vol. 294, Aug. 21, 2012, pp. 63-68.
International Search Report and Written Opinion on PCT Application No. PCT/US2019/063099 dated Mar. 12, 2020, 9 pages.
Office Action (with English translation) in corresponding Japanese Patent Application No. 2021-528982, issued Oct. 11, 2023, 15 pages.
International Preliminary Report on Patentability on PCT/US2019/063099 dated Jun. 10, 2021.
Office Action on Chinese Application No. 201980076917.0 dated Feb. 26, 2024.

* cited by examiner

CATALYST LAYER WITH EXTENDED SURFACE AREA AND METHOD OF FORMING SUCH CATALYST LAYER FOR POLYMER ELECTROLYTE FUEL CELLS

CROSS-REFERENCE TO RELATED APPLICATIONS

This application is a National Stage Entry of PCT/US2019/063099, filed Nov. 25, 2019, which claims the benefit of and priority to U.S. Provisional Application No. 62/771,540, filed Nov. 26, 2018, the contents of which are incorporated herein by reference in their entirety.

TECHNICAL FIELD

This disclosure generally relates to a catalyst layer for polymer electrolyte fuel cells.

BACKGROUND

The state-of-the-art catalyst development involves catalyst synthesis, formulation of an ink composition as a slurry, and coating of the ink composition. To develop an ink composition for coating, a binder (in many cases an ionomer that serves both as the binder and a proton conductor) along with a solvent (e.g., an alcohol) and one or more additives (e.g., dispersion agents) are typically added for dispersing a supported catalyst (e.g., carbon supported platinum catalyst or Pt/C). Certain components of the ink composition, such as the solvent and the additives, can adversely interact with catalytic surfaces and lower their catalytic activity.

It is against this background that a need arose to develop embodiments of this disclosure.

SUMMARY

In some embodiments, a manufacturing process includes: depositing a catalyst support on a gas diffusion layer to form a catalyst support-coated gas diffusion layer; depositing a catalyst on the catalyst support-coated gas diffusion layer to form a catalyst-coated gas diffusion layer; and depositing an ionomer on the catalyst-coated gas diffusion layer to form an ionomer-coated gas diffusion layer.

In some embodiments, a membrane electrode assembly for a fuel cell includes: a gas diffusion layer; a polymer electrolyte membrane; and a catalyst layer disposed between the gas diffusion layer and the polymer electrolyte membrane, wherein the catalyst layer includes an ionomer, and a concentration of the ionomer varies within the catalyst layer according to a concentration profile.

In some embodiments, a fuel cell includes the membrane electrode assembly of any of the foregoing embodiments.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 6. (a) Cross section of a sample catalyst layer between a gas diffusion layer and a polymer electrolyte membrane. (b) Ionomer density as a function of distance along a direction from the polymer electrolyte membrane towards the gas diffusion layer.

DESCRIPTION

Figure 1:
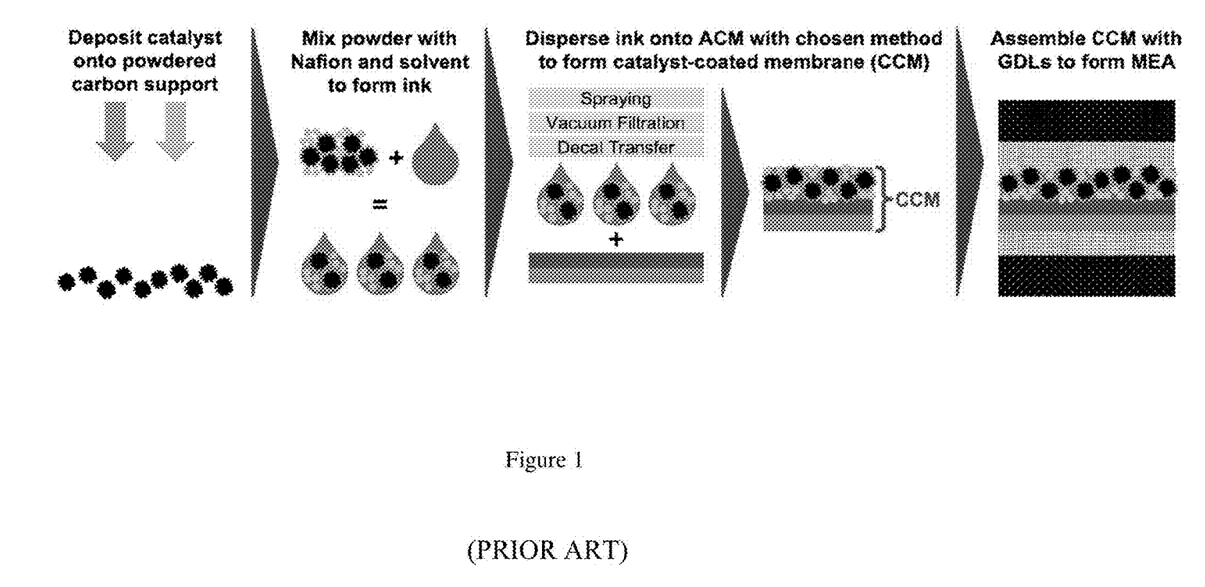
FIG. 1. Schematic process flow of a comparative manufacturing process of a polymer electrolyte fuel cell.

By way of illustrating a contrast with an improved process explained further below, FIG. 1 is a schematic process flow of a comparative manufacturing process of a polymer electrolyte fuel cell. The process flow includes depositing a catalyst (e.g., platinum (Pt)) on a catalyst support (e.g., a carbon support) as a powder to form a supported catalyst. Next, the process flow includes mixing the supported catalyst with a binder (e.g., a sulfonated tetrafluoroethylene-based fluoropolymer such as Nafion) along with a solvent (e.g., an alcohol) and one or more additives to form an ink composition. Next, the process flow includes depositing the ink composition on an anode-coated membrane (ACM), such as via spraying, vacuum filtration, or transfer printing, to form a catalyst-coated membrane (CCM). Finally, the process flow includes assembling the CCM by disposing the CCM between a pair of gas diffusion layers (GDLs) to form a membrane electrode assembly (MEA). The MEA is then assembled between a pair of flow plates to result in the polymer electrolyte fuel cell. In the comparative process, certain components of the ink composition, such as the solvent and the additives, can adversely interact with catalytic surfaces and lower their catalytic activity.

Figure 2:
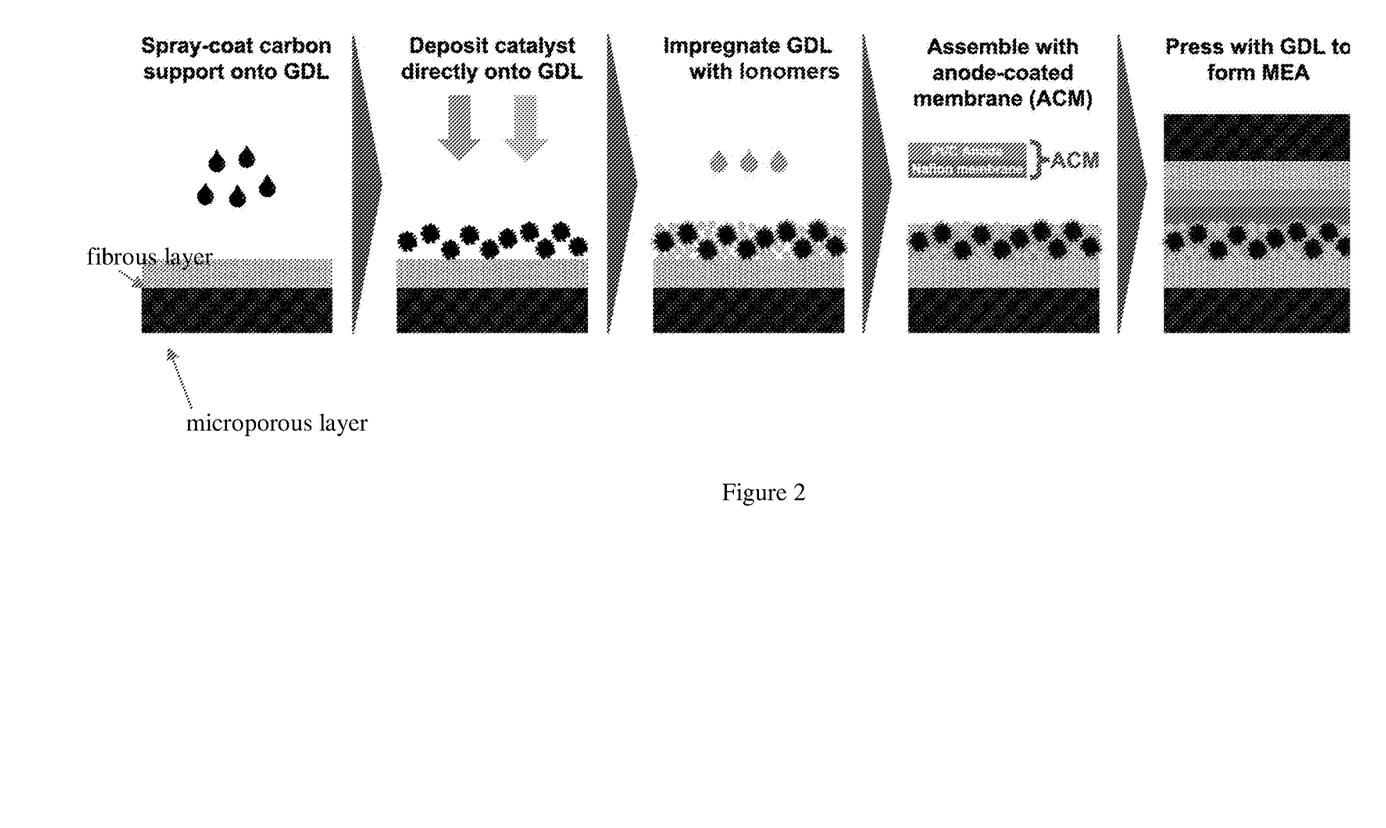
FIG. 2. Schematic process flow of an improved manufacturing process of a polymer electrolyte fuel cell.

FIG. 2 is a schematic process flow of an improved manufacturing process of a polymer electrolyte fuel cell. By way of overview, the improved process includes a stage of depositing a catalyst support, followed by a stage of depositing a catalyst, thereby decoupling the deposition of the catalyst from the deposition of the catalyst support.

Referring to FIG. 2, the process flow includes depositing a catalyst support on a GDL, such as via spraying or another coating technique, to form a catalyst support-coated GDL. The catalyst support can be in the form of nanoparticles, such as carbonaceous nanoparticles having sizes in a range of about 5 nm to about 500 nm or more, such as from about 10 nm to about 400 nm, from about 10 nm to about 300 nm, from about 10 nm to about 200 nm, from about 10 nm to about 150 nm, or from about 10 nm to about 100 nm, and having aspect ratios of about 3 or less, or about 2 or less. Other types of catalyst supports can be used, such as carbon nanohorns, carbon nanofibers, carbon nanoribbons, graphite, and graphene sheets, as well as non-carbon-based supports. The catalyst support can be dispersed in an ink composition that also includes a solvent, one or more additives, and a binder, followed by a post-processing treatment, such as sintering, in which the solvent, the additives, and the binder are substantially removed. In the absence of a catalyst, there is greater flexibility in choosing solvents, dispersion agents, coating techniques, and post-processing treatments in depositing the catalyst support to form a catalyst support layer. The catalyst support layer can be designed and optimized according to specifications on surface area, ionomer incorporation, water management, and so forth, without compromising catalytic activity. As illustrated in FIG. 2, the GDL includes a carbonaceous fibrous layer, such as carbon cloth or carbon paper, which is covered by a microporous layer, and where the catalyst support is deposited on a surface of the microporous layer. Other configurations of the GDL can be implemented, such as where the microporous layer is omitted.

Next, the process flow includes depositing a catalyst on an extended surface area provided by the catalyst support layer, thereby yielding a catalyst-coated GDL including a catalyst layer with an extended surface area. By depositing the catalyst subsequent to the deposition of the catalyst support, the catalyst is not exposed or mixed with certain components of an ink composition that can lower its catalytic activity, such as an alcohol used as a solvent in the ink composition. A technique that can conformally coat extended surface areas, such as atomic layer deposition, can be used for depositing the catalyst on the extended surface area provided by the catalyst support layer. The catalyst can include a platinum group metal (PGM), such as Pt. In addition to Pt, deposition can be performed for other PGMs, such as ruthenium (Ru), rhodium (Rh), palladium (Pd), osmium (Os), and iridium (Ir), as well as other noble metals, such as silver (Ag) and gold (Au), as well as an alloy or other multi-element material including one or more of the foregoing.

In the case of atomic layer deposition, the deposition includes performing a first atomic layer deposition cycle to deposit a material of the catalyst on the catalyst support layer and the GDL held within a deposition chamber, followed by performing a second atomic layer deposition cycle to deposit the material on the catalyst support layer and the GDL, followed by performing a third atomic layer deposition cycle to deposit the material on the catalyst support layer and the GDL, and so on until a requisite amount of the material is deposited. A number of deposition cycles can be, for example, in a range from 1 to 5000, from 2 to 4000, from 3 to 3000, from 5 to 2000, or from 10 to 1000.

Performing each atomic layer deposition cycle includes sequentially exposing the catalyst support layer and the GDL, to deposition gases including a first precursor containing the material to be deposited, and a second oxidative precursor. In the case of a single element metal, for example, the first precursor can be a metal-containing precursor such as an organometallic compound with a metal coordinated with organic ligands, and the second oxidative precursor can be oxygen, ozone, or oxygen plasma. For example, for the specific case of Pt, the first precursor can be trimethyl (methylcyclopentadienyl) platinum (IV) or another Pt-containing organometallic compound. In addition to Pt, deposition can be performed for other noble metals, as well as other single element metals. During the first atomic layer deposition cycle, the first precursor is introduced into the chamber to result in the first precursor being adsorbed to the catalyst support and the GDL, in the form of molecules of the first precursor, residues of the molecules of the first precursor, or a combination of both, and the second oxidative precursor is introduced into the chamber to result in a reaction between the adsorbed first precursor and the second oxidative precursor to liberate ligands included in the adsorbed first precursor, thereby leaving the material deposited on the catalyst support and the GDL. A second reductive precursor, such as hydrogen or hydrogen plasma, can be used in place of, or in combination with, the second oxidative precursor. A removal operation can be performed subsequent to introducing each precursor to remove reaction products and any unreacted precursor, such as by evacuation or purging with an inert carrier gas.

Next, the process flow includes depositing an ionomer on the catalyst layer of the catalyst-coated GDL, such as via spraying or another coating technique, to at least partially impregnate the ionomer into the catalyst layer and form an ionomer-coated GDL. Next, the process flow includes assembling the ionomer-coated GDL with an ACM, which includes a polymer electrolyte membrane and an anode catalyst layer covering the polymer electrolyte membrane. The resulting intermediate assembly is then pressed or laminated with another GDL to form a MEA, followed by assembling the MEA between a pair of flow plates to result in the polymer electrolyte fuel cell.

Advantageously, the improved process opens up a wider selection of catalyst supports, catalysts, and ionomers, which can be difficult to disperse together in an ink composition of the comparative process. Also, by decoupling the deposition of a catalyst and the deposition of a catalyst support, the improved process can effectively address up-scaling for high-throughput catalyst screening and large-scale deployment of catalysts into polymer electrolyte fuel cells. The improved process also provides a path to tune ionomer-catalyst interactions, which can improve the performance of fuel cells.

The improved process can also result in an improved structure of a catalyst layer with high performance. Examples are set forth below:

1. Solvent-Free Catalyst Layer

Figure 3:
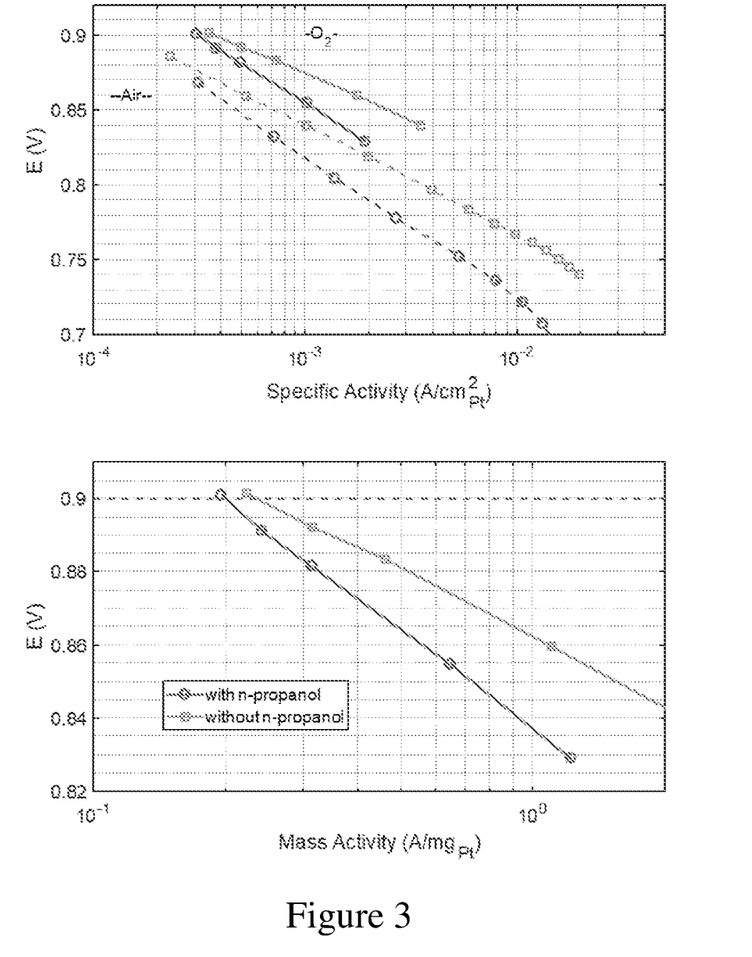
FIG. 3. Comparison of the specific activity and mass activity of catalyst layers with and without n-propanol.

A catalyst layer in a polymer electrolyte fuel cell typically includes a detectable amount of an alcohol, which is used as a solvent for an ink composition. A substantially alcohol-free catalyst layer resulting from the improved process can lead to higher performance, as shown by FIG. 3 below. FIG. 3 compares the specific activity of catalyst layers under air (dashed lines in the top panel) and oxygen (solid lines in the top panel) and the mass activity of the catalyst layers (solid lines in the bottom panel). The catalyst layer without detectable n-propanol (a solvent used in an ink composition) shows higher specific activity and higher mass activity than that with detectable n-propanol. The Tafel slope (slope of the curves, where a lower slope is indicative of higher performance) also indicates that the substantially alcohol-free catalyst layer has higher performance. Detection of n-propanol or another alcohol can be performed by infrared spectroscopy, where presence or absence of a detectable amount of an alcohol is reflected by presence or absence of a characteristic absorption band of the alcohol, such as a peak or trough associated with —OH group.

Figure 4:
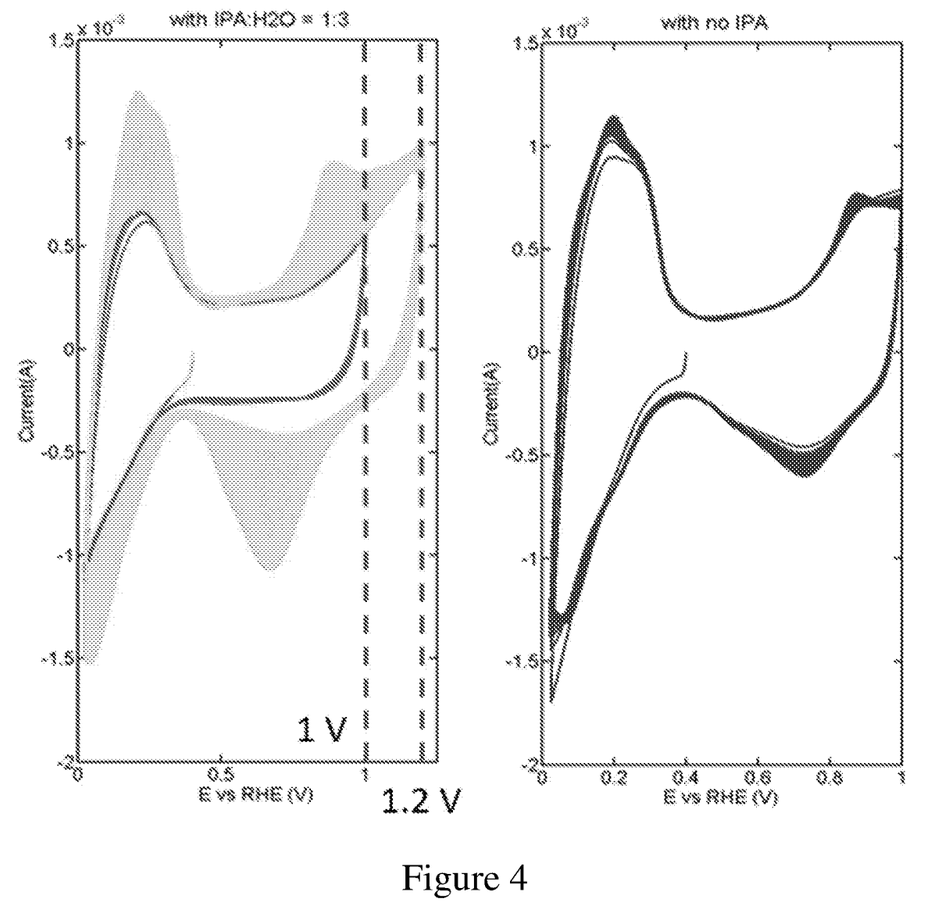
FIG. 4. Cyclic voltammetry scans of catalyst layers with and without isopropanol.

Presence or absence of a detectable amount of an alcohol in a catalyst layer is also reflected by cyclic voltammetry. For example, when a catalyst layer is formed from an isopropanol (IPA)—containing ink composition, Pt/IPA interaction can be triggered under certain voltages. As shown in the left panel of FIG. 4, the interaction is not noticeable under cyclic voltammetry from about 0.02-1 V. Under this voltage range, the features in —OH adsorption/desorption region (about 0.75-1 V) are suppressed as compared to a substantially isopropanol-free catalyst layer in the right panel of FIG. 4. When the upper bound of cyclic voltammetry is increased from about 1 V to about 1.2 V, an increase of current in the adsorption/desorption region is observed, as well as that in the —OH adsorption/desorption region, indicating Pt catalyzed the removal of isopropanol which increases electrochemical surface areas on the Pt surface.

2. Catalyst Layer with Gradient Ionomer Concentration

Figure 5:
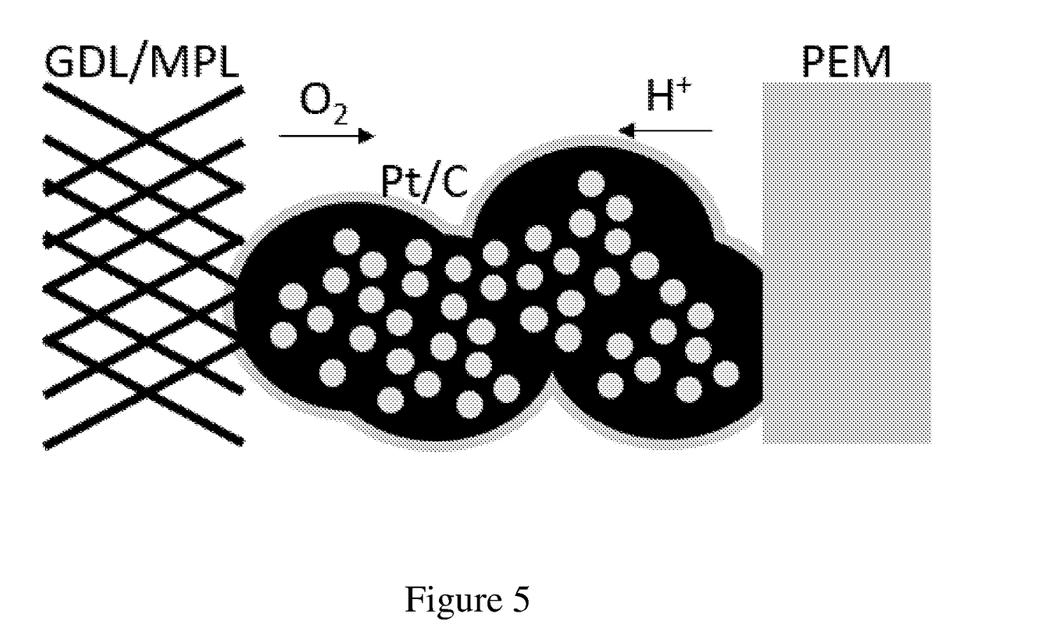
FIG. 5. Schematic of a catalyst layer between a gas diffusion layer and a polymer electrolyte membrane.

As shown in FIG. 5, a catalyst layer has one surface disposed adjacent and attached to a microporous layer of a GDL and an opposite surface disposed adjacent and attached to a polymer electrolyte membrane (PEM). From a proton conductivity standpoint, a greater concentration of an ionomer (a proton conductor) can benefit proton transport. Nevertheless, oxygen mass transport impedance in the ionomer also should be considered. Oxygen, in most cases, diffuses from the GDL through the ionomer to reach catalytic surfaces. With this respect, a lesser concentration of the ionomer is desirable. These two effects can lead to a compromise in an ionomer/catalyst ratio if the ionomer and the catalyst are homogenously mixed in an ink composition. In the improved process, optimization of a balance between these two effects can be achieved with a gradient concentration of an ionomer, by including a greater concentration of the ionomer at the PEM side compared to the GDL side. Proton transports from the PEM side to the GDL side, with a current density decreasing in this direction. The criterion of proton conductivity is less on the GDL side compared to the PEM side. Oxygen diffuses from the GDL side to the PEM side, so a lower concentration or density of the ionomer at the GDL side benefits oxygen diffusion and enhances oxygen utilization. The ionomer gradient with a greater concentration or density on the PEM side descending to the GDL side suits both proton conductivity and oxygen transport impedance. This concentration gradient can be realized in the improved process where the ionomer is impregnated after deposition of the catalyst, and the gradient can be tuned by a viscosity and a surface tension of a solution of the ionomer. For example, a concentration or density of the ionomer adjacent to a first interface between the catalyst layer and the PEM can be a first concentration or density, a concentration or density of the ionomer adjacent to a second interface between the catalyst layer and the GDL can be a second concentration or density, and a concentration or density of the ionomer at a position halfway between the first interface and the second interface can be a third concentration or density, where the first concentration is greater (e.g., at least about 1.1 times greater, at least about 1.3 times greater, or at least about 1.5 times greater) than the second concentration, the first concentration is greater (e.g., at least about 1.05 times greater, at least about 1.1 times greater, or at least about 1.2 times greater) than the third concentration, and the third concentration is greater than the second concentration (e.g., at least about 1.05 times greater, at least about 1.1 times greater, or at least about 1.2 times greater). More generally, a concentration of an ionomer can vary according to an ionomer gradient with a greater (or a lesser) concentration on the PEM side descending (or ascending) to the GDL side, or can vary according to another concentration profile. Also, a concentration of a catalyst or a catalyst support can vary according to a gradient or other concentration profile. Characterization of an ionomer gradient can be performed by Auger electron spectroscopy, where a concentration of an ionomer is reflected by an intensity of an Auger peak of a characteristic element present in the ionomer (e.g., fluorine or sulfur) and not present in other components of a catalyst layer. Characterization of an ionomer gradient also can be performed by image analysis, such as cross-sectional scanning electron microscopy analysis.

Figure 6:
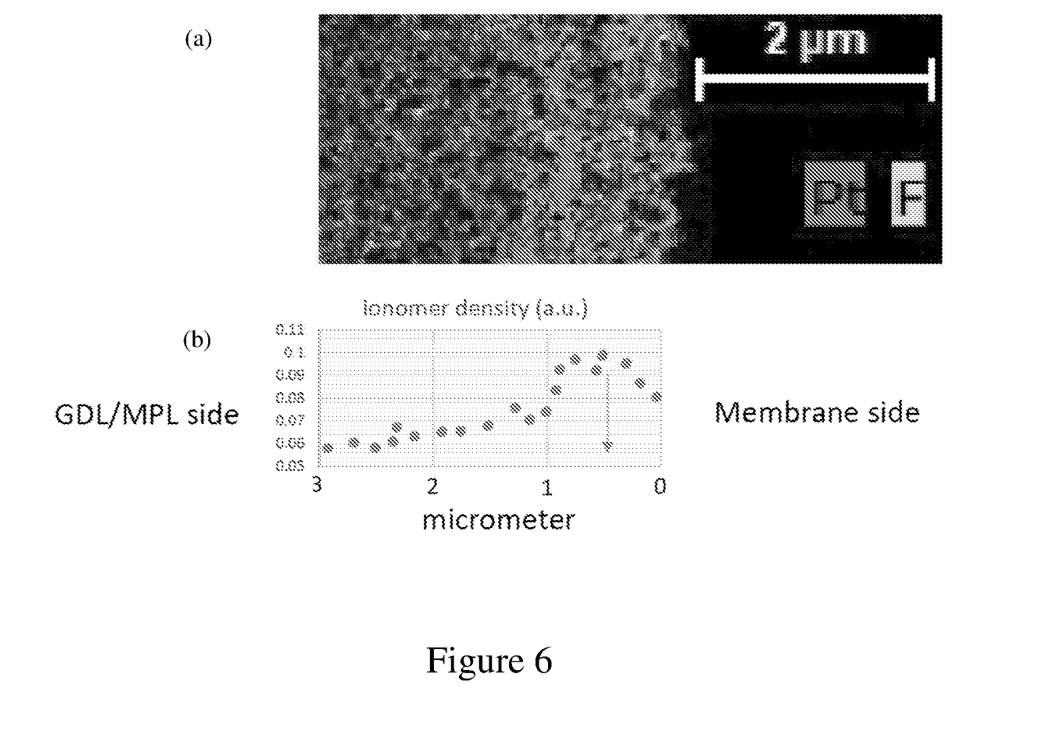

FIG. 6(a) shows a cross section of a sample catalyst layer with a GDL facing a left side. It is shaded by chemical mapping using energy dispersive X-ray spectroscopy (EDS) in scanning transmission electron microscopy (STEM), which quantifies platinum (Pt) and fluorine (F) contained in each pixel. Since an ionomer includes F, the intensity of F is proportional to that of the ionomer density. A profile is constructed by adding F intensities of each pixel at a same thickness level in the catalyst layer. As shown in FIG. 6(b), the profile indicates a decreasing ionomer density from the side facing a membrane towards the side facing the GDL.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In the description of some embodiments, an object "on" another object can encompass cases where the former object is directly on (e.g., in physical contact with) the latter object, as well as cases where one or more intervening objects are located between the former object and the latter object.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A manufacturing process comprising:
   depositing a catalyst support on a gas diffusion layer to form a catalyst support-coated gas diffusion layer;
   depositing, by atomic layer deposition, a catalyst layer on the catalyst support-coated gas diffusion layer to form a catalyst-coated gas diffusion layer; and depositing an ionomer on the catalyst-coated gas diffusion layer to form an ionomer-coated gas diffusion layer;
wherein:
depositing the catalyst support is decoupled from depositing the catalyst layer;
depositing the ionomer is decoupled from depositing the catalyst layer;
depositing the ionomer comprises at least partially impregnating the ionomer into the catalyst layer, and the ionomer is deposited according to a concentration gradient wherein a concentration of the ionomer descends in a direction toward the gas diffusion layer; and
the catalyst layer is substantially alcohol-free.

2. The manufacturing process of claim 1, wherein the catalyst support includes carbonaceous nanoparticles.

3. The manufacturing process of claim 1, wherein depositing the catalyst support includes forming an ink composition including the catalyst support and a solvent, and applying the ink composition on the gas diffusion layer.

4. The manufacturing process of claim 3, further comprising removing the solvent subsequent to applying the ink composition.

5. The manufacturing process of claim 1, wherein the catalyst layer comprises a platinum group metal.

6. The manufacturing process of claim 1, further comprising assembling the ionomer-coated gas diffusion layer with an anode-coated membrane to form an intermediate assembly, and laminating the intermediate assembly with another gas diffusion layer to form a membrane electrode assembly.

7. A membrane electrode assembly for a fuel cell, comprising:

a gas diffusion layer;
a polymer electrolyte membrane; and
a catalyst layer disposed between the gas diffusion layer and the polymer electrolyte membrane, wherein the catalyst layer comprises an ionomer, and a concentration of the ionomer varies within the catalyst layer according to a concentration profile, wherein a concentration of the ionomer descends in a direction from the polymer electrolyte membrane toward the gas diffusion layer;
wherein the catalyst layer is substantially alcohol-free,
wherein the membrane electrode assembly is produced by a manufacturing process comprising:
depositing a catalyst support on the gas diffusion layer to form a catalyst support-coated gas diffusion layer;
depositing, by atomic layer deposition, the catalyst layer on the catalyst support-coated gas diffusion layer to form a catalyst-coated gas diffusion layer;
depositing the ionomer on the catalyst-coated gas diffusion layer to form an ionomer-coated gas diffusion layer, and
contacting the catalyst layer with the polymer electrolyte membrane, wherein:
depositing the catalyst support is decoupled from depositing the catalyst layer:
depositing the ionomer is decoupled from depositing the catalyst layer;
depositing the ionomer comprises at least partially impregnating the ionomer into the catalyst layer.

8. A fuel cell comprising the membrane electrode assembly of claim 7.

* * * * *